United States Patent
Addante et al.

(10) Patent No.: US 7,720,911 B2
(45) Date of Patent: May 18, 2010

(54) EMAIL USING QUEUES IN NON-PERSISTENT MEMORY

(75) Inventors: Frank Addante, Los Angeles, CA (US); Tim McQuillen, Los Angeles, CA (US)

(73) Assignee: StrongMail Systems, Inc., Redwood City, CA (US)

( * ) Notice: Subject to any disclaimer, the term of this patent is extended or adjusted under 35 U.S.C. 154(b) by 1530 days.

(21) Appl. No.: 10/777,336

(22) Filed: Feb. 11, 2004

(65) Prior Publication Data

US 2004/0167965 A1 Aug. 26, 2004

Related U.S. Application Data

(60) Provisional application No. 60/449,301, filed on Feb. 20, 2003.

(51) Int. Cl.
*G06F 15/16* (2006.01)
(52) U.S. Cl. ........................ 709/206; 709/207
(58) Field of Classification Search ................. 709/206
See application file for complete search history.

(56) References Cited

U.S. PATENT DOCUMENTS

| | | | |
|---|---|---|---|
| 5,937,162 A | 8/1999 | Funk et al. | |
| 5,999,967 A | 12/1999 | Sundsted | |
| 6,249,807 B1 * | 6/2001 | Shaw et al. | ................. 709/206 |
| 6,484,197 B1 | 11/2002 | Donohue | |
| 6,519,471 B1 | 2/2003 | Yamaguchi | |
| 6,526,436 B1 | 2/2003 | Shiraishi et al. | |
| 6,577,860 B1 | 6/2003 | Yoshida | |
| 6,850,968 B1 | 2/2005 | Pfeffer et al. | |
| 2002/0120705 A1 | 8/2002 | Schiavone et al. | |
| 2002/0143885 A1 * | 10/2002 | Ross, Jr. | ..................... 709/207 |

(Continued)

FOREIGN PATENT DOCUMENTS

EP   0 491 367 A2   6/1992

(Continued)

OTHER PUBLICATIONS

Process Software et al: "PMDF System Manager's Guide" Online, Sep. 2001; pp. 33-1-33-7.

(Continued)

*Primary Examiner*—Vivek Srivastava
*Assistant Examiner*—Ryan J Jakovac
(74) *Attorney, Agent, or Firm*—Jones Day; Brett Lovejoy

(57) ABSTRACT

An e-mail processing system that preferably operates solely within nonpersistent storage such as random access memory. Queues of e-mails are formed within the random access memory, where each queue includes a pointer to personalized information about the e-mail, directed to a specific domain. In order to send the e-mail, a channel is opened to the domain, and while open, e-mails within the queue are sent. A special recovery agent periodically takes snapshots of the state of processing within the system. Since the processing is occurring within nonpersistent storage, a failure within the system can be recovered by using the snapshots to recover where each email is processing. In one aspect, the feed rate to the other e-mail servers is adjusted based on the rate of those e-mail servers. Also, the system asynchronously looks up information such as DNS information while it is processing information for other e-mails.

37 Claims, 7 Drawing Sheets

U.S. PATENT DOCUMENTS

| | | |
|---|---|---|
| 2002/0181703 A1 | 12/2002 | Logan et al. |
| 2003/0018727 A1 | 1/2003 | Yamamoto |
| 2003/0018728 A1 | 1/2003 | Kaneta et al. |
| 2003/0028580 A1 | 2/2003 | Kucherawy |
| 2003/0135573 A1 | 7/2003 | Taylor |
| 2006/0053200 A1 | 3/2006 | McCown |
| 2006/0129592 A1 | 6/2006 | Poozhiyil et al. |

FOREIGN PATENT DOCUMENTS

| | | |
|---|---|---|
| EP | 491367 A2 * | 6/1992 |
| EP | 1 298 872 A2 | 2/2003 |
| EP | 1 298 872 A2 | 4/2003 |
| EP | 1 715 640 A2 | 10/2006 |
| JP | H11-317745 | 11/1999 |
| JP | 2002-032307 | 1/2002 |
| WO | WO 02/13470 | 2/2002 |

OTHER PUBLICATIONS

SuperSpeed Software Inc. White Paper: "Increasing Performance in the Mission Critical Environment" SuperSpeed, Nov. 29, 2001, pp. 1-12.

PCT/US04/04305, PCT Written Opinion, dated Mar. 10, 2005.
PCT/US04/04305, PCT International Search Report, dated Mar. 10, 2005.
EP 06 01 3039.0-2416, Partial European Search Report, dated Sep. 10, 2006.
EP 04 710 291.8-2416, Supplementary European Search Report, dated Sep. 28, 2006.
EP 06 013 040.8-2416, European Search Report, dated Oct. 30, 2006.
EP 06 013 041.6-2416, European Search Report, dated Oct. 31, 2006.
EP 04 710 291.8-2416, Communication dated Dec. 29, 2006.
EP 06 013 040.8-2416, Communication dated Sep. 27, 2007.
EP 04 710 291.8-2416, Communication dated Dec. 14, 2007.
EP 06 01 3039.0-2416, European Search Report, dated Jan. 23, 2007.
EPO, Communication pursuant to Article 94(3) EPC dated Mar. 1, 2010 for European application 06 013 040.8.
Applicant's response dated Aug. 3, 2009 to EPO Communication pursuant to Article 94(3) EPC issued on Apr. 2, 2009 for European application 06 013 040.8.
JPO Office Action with mailing date Oct. 6, 2009 for Japanese patent application No. 2006-503565—English translation provided.

* cited by examiner

EMAIL USING QUEUES IN NON-PERSISTENT MEMORY

CROSS REFERENCE TO RELATED APPLICATIONS

This application claims the benefit of U.S. Provisional Application No. 60/449,301, filed on Feb. 20, 2003, the contents of which are herewith incorporated by reference.

BACKGROUND

E-mail is a well-established process of sending a text message from a sender to a recipient. The process of conventional e-mail is defined by a number of different interacting protocols and servers.

In conventional e-mail, a personal computer 100 runs an e-mail client 102. Well-known e-mail clients include Microsoft outlook and Outlook express. The e-mail client may be a standalone client, or may be a modified e-mail client running within a web page such as "Hotmail". The e-mail client lists the messages in the user's mailbox by headers, and allows the user to select and read the e-mail that is associated with that header. An e-mail client also allows creation of new messages and sending of the new messages.

The e-mail client communicates with an e-mail server 120 at the user's local Internet Service provider, here shown as "domain" 99, in order to send and receive messages over the Internet 110 or more generally over any network connection. A domain can include a single mail cluster, e.g., all of hotmail.com, or can include multiple mail clusters that are somehow associated.

The server receives e-mail messages from a client 102, and forms a list of those messages. The server 120 typically includes a processor or computer of some type, running the special email programs that are described herein.

The mechanics of the e-mail system operate by using three different protocols, known as SMTP, POP3 and IMAP. The SMTP server listens on port 25 to receive incoming emails. The POP3 server 140 handles delivery of local messages to the local mailboxes, such as 145. The mailbox is really a queue that is formed to provide the message an email client, when that client logs in to the POP3 server 140 at the domain 99.

Sending emails is handled differently than receiving emails. In order to send an e-mail, the e-mail client 102 interacts with the SMTP server 130 at the domain 99. If the message is intended for another mailbox within the same domain, then the SMTP server 130 sends the message to the local POP3 server 140. If the message is intended for another domain, the SMTP server communicates with a domain name server or DNS 135. The DNS stores a database, which is updated from the Internet, that stores the IP address for all domains. The DNS provides the IP address to the SMTP server 130.

The messages are stored on the hard drive 131 of the SMTP server 130. Software called a "picker" often operates to streamline the operations. The picker looks at messages stored on the SMTP server's hard drive 131, and carries out the mechanics of analyzing the message headers for destination, communicating with the DNS, and looking for an available port for the SMTP server on the destination domain.

Once these operations are completed, the SMTP server 130 sends the message using the IP address that it obtained from the DNS server 135 to another SMTP server 150 at the destination domain 149. The SMTP server 130 communicates with the corresponding SMTP server 155 at domain 149. The message is transferred to the SMTP server 155 at domain 149. Since SMTP server 155 recognizes that the message is for a local mailbox, it provides the message to its local POP3 server 160 which queues the message to a local mailbox 165.

Sending email often uses an open-source program known as Sendmail™ which also includes many additional capabilities, including the ability to queue messages which cannot be sent immediately.

The receiving of emails uses POP3 server. The POP3 server maintains a collection of text files, one for each e-mail that has been sent or received. Each time a new e-mail is received, it adds that e-mail to its recipient file, or mailbox. The e-mail client 102 communicates with the POP3 server 140 at the local domain 99. The POP3 server provides the e-mail client 102 with contents of its mailbox, and then deletes the messages.

An IMAP server may be used in addition to or in place of POP3. IMAP allows the e-mail into folders which stay on the server.

For a large e-mail server, there may be many pickers operating at once, e.g. 50 to 100 pickers. Each of these pickers are obtaining information from the SMTP server's hard drive 131, moving messages one at a time from the hard drive.

SUMMARY

It has been noticed that throughput limitations often occur in conventional e-mail systems of the type noted above. Certain limitations may be caused by the need to access files that are on the hard drive of the SMTP server.

The present system describes a messaging system that may operate in this conventional e-mail environment, but which may reduce delays caused by the operations. The inventor recognized that the operations on the hard drive of the SMTP server can burden the server and can also cause limits in throughput. According to an embodiment, the messaging system may store the mail in memory queues and memory queue maps that are formed within non-persistent, e.g., random access memory. A message transfer agent formats the messages and addresses, and organizes them to be sent from the memory. Therefore, for example, this system allows opening a pipe to a specific domain such as Hotmail, and then sending through as many messages as possible.

In an embodiment, e-mail messages are read directly from the database into memory and delivered to mailboxes or a host, without writing those e-mails back to persistent storage as part of the e-mail handling routine.

One aspect describes a message wrapper utility that divides the message into personalized and non-personalized parts.

Another aspect describes a crash prevention agent that stores the information within the non-persistent memory at intervals. The state of the application processing is thus saved to disk, in a very efficient way. This facilitates recovery in the event of a crash, while minimizing the amount of the information which is actually saved to disk.

BRIEF DESCRIPTION OF THE DRAWINGS

These and other aspects will now be described in detail with reference to the accompanying drawings, wherein.

DETAILED DESCRIPTION

The present system describes an improved e-mail handling and transferring system.

Initially, the description given herein is a description of software modules which run on a general-purpose computer, such as a workstation type computer or a computer based on the x86 architecture. However, it should be understood that the description is given herein could operate as hardware, for example based on the dedicated circuitry, or in FPGA components, with the functions being defined in hardware definition language. While the description given herein is of software, the inventors intend this description to similarly cover hardware devices which operate in comparable ways to that described herein.

Figure 1:
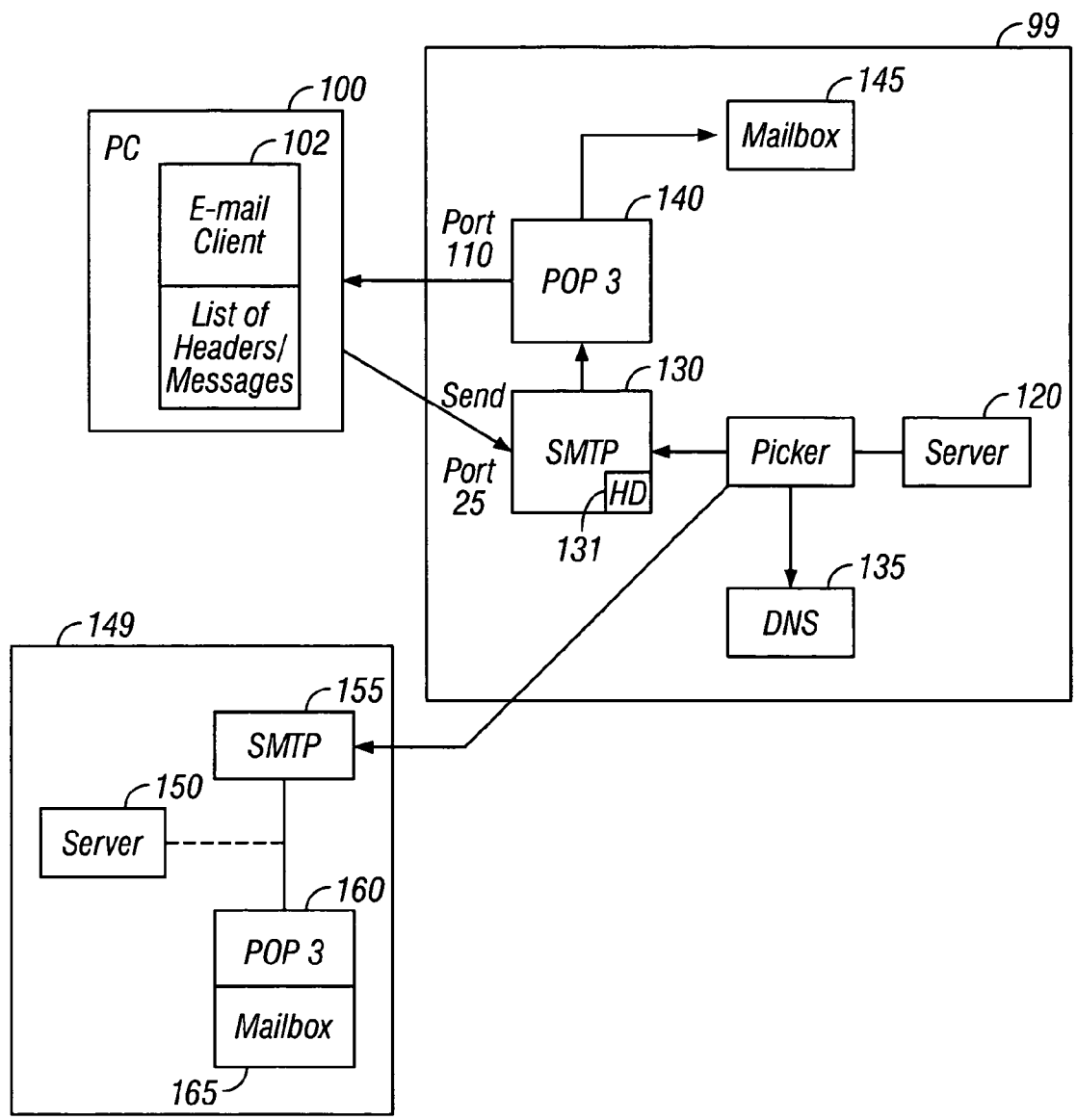
FIG. 1 shows a diagram of e-mail flow.
Figure 2:
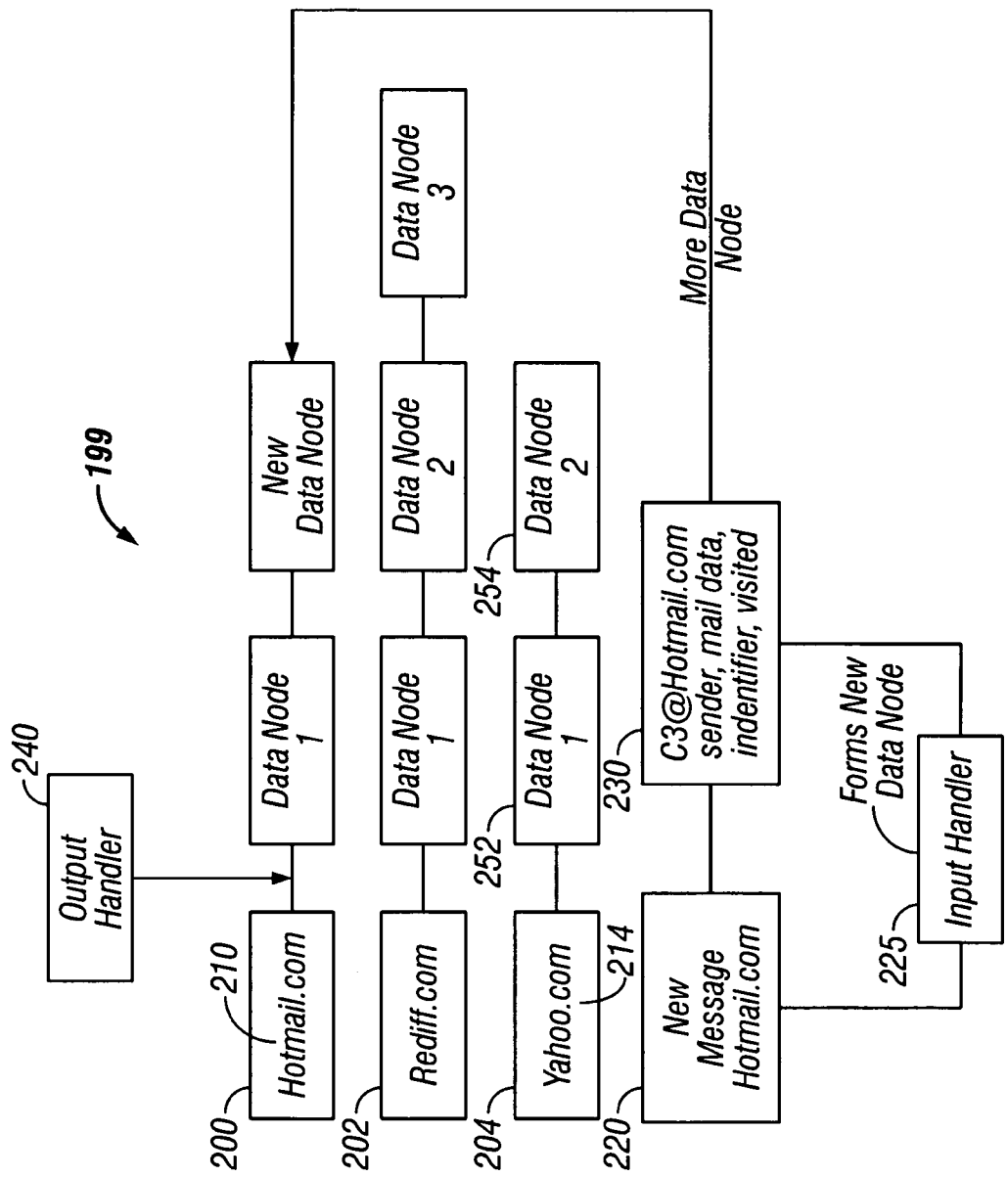
FIG. 2 shows a diagram of the queues that are formed according to the present system.

FIG. 2 illustrates the formation and use of a message queue map. The message queue map is preferably formed in non persistent storage, e.g., random access memory running within a mail server, e.g., the server performing the SMTP function. In a preferred embodiment, the entire mail processing operation occurs in non-persistent memory of this type.

Prior systems have taught away from using non-persistent memory for the email processing. In fact, the use of non-persistent memory could cause significant problems when and if the system crashes during operation. The present system, however, teaches a way to avoid loss of functionality during a crash, by storing information about which emails have been processed, and the state of processing of these emails. An aspect describes a very efficient way to save that state.

The queue map which is shown in FIG. 2 has a number of message queues shown respectively as 200, 202 and 204. Each of the message queues is defined based on various variables that may include domain name, systems user (in case of virtual servers). In simplest version of a queue, it is associated with a specific domain. For example, message queue 200 is associated with domain 210 which is Hotmail.com. Message queue 204, intended for yahoo.com (domain 214), includes two different data nodes 252, 254, which are each intended for delivery to domain yahoo.com. Each data node represents personalized information about the e-mail to be sent.

Figure 3:
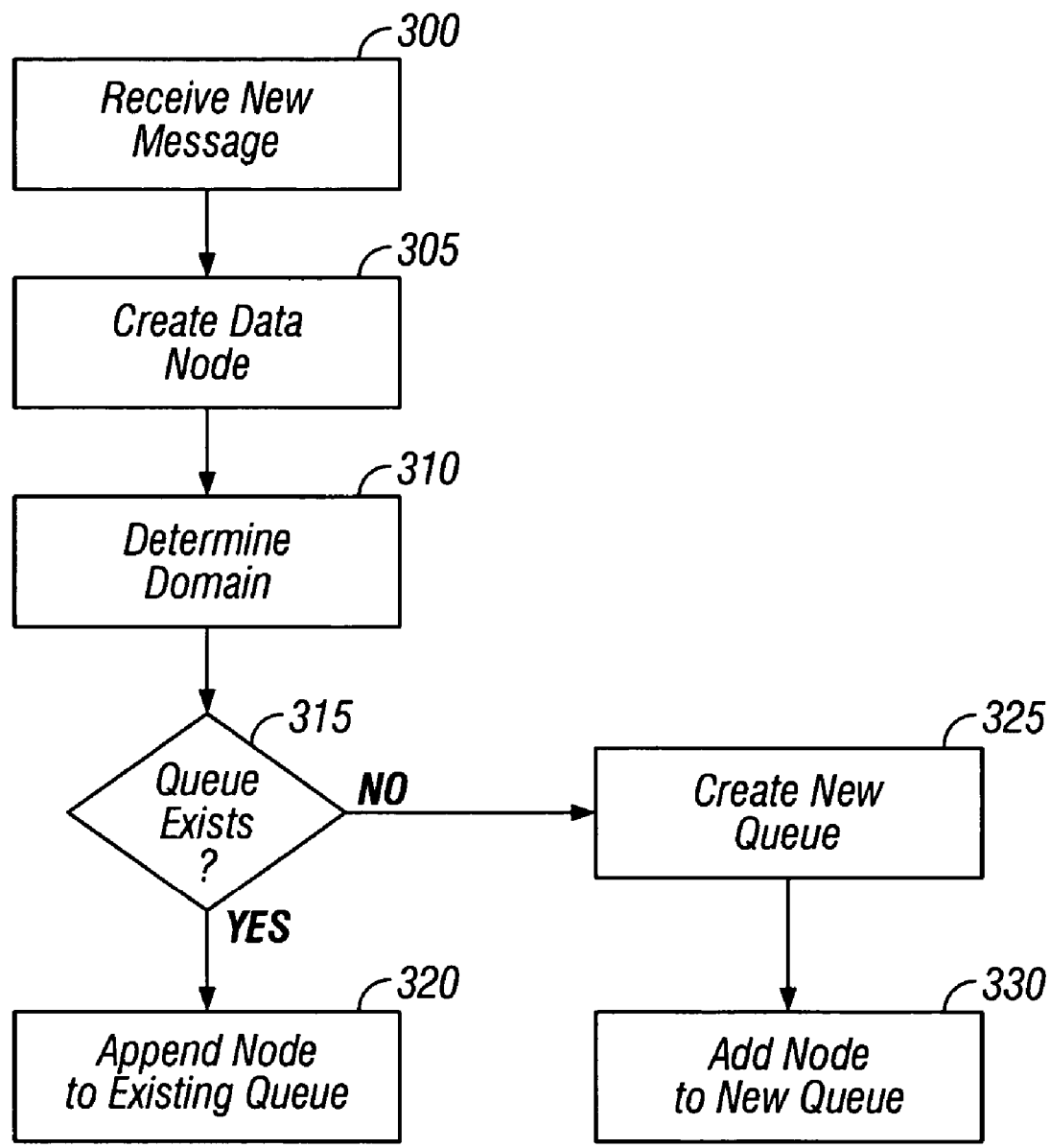
FIG. 3 shows a flowchart of creating and handling the queues.

A new message 220 is also shown. As part of the operation, this new message needs to be added into the existing queue map. An input handler shown as 225 may operate as shown in the flowchart of FIG. 3. At 300, the process receives the new message 220. The input handler operates, at 305, to create a data node 230 as a digest representing the message. A data node in this embodiment is an object that represents one message. The data node includes information about the message being sent; and may include the recipient, sender, data about the email, domain, a unique session identifier, visit count, and other information for Quality of Service ("QoS") guarantees and routing specifics. Note that the nodes are not the emails themselves—rather they are just pointers to the emails as stored in memory.

The data node is analyzed to determine the appropriate queue (function of domain and miscellaneous variables) at 310. Step 315 determines if the message can be appended to an existing queue. If so, then the data node is appended to the existing queue at 320.

For example, here the new message 220 is intended for the domain 210 of Hotmail.com. Therefore, the data node 230 is appended to the end of the existing queue 200.

In the alternative, if the node cannot be put into an existing queue at 315, then a new queue is created at 325, and the data node 230 is appended to the newly created queue at 330. In this way, multiple queues are formed, each relating to nodes representing messages with similar routing strategies. Multiple queues may be provided for each queue variable if the existing queue has more than a maximum number of messages.

Since each queue represents messages that will require the same processing strategy such as delivery to the same domain, the entire queue of messages can be sent at once, thereby streamlining the sending process.

Figure 4:
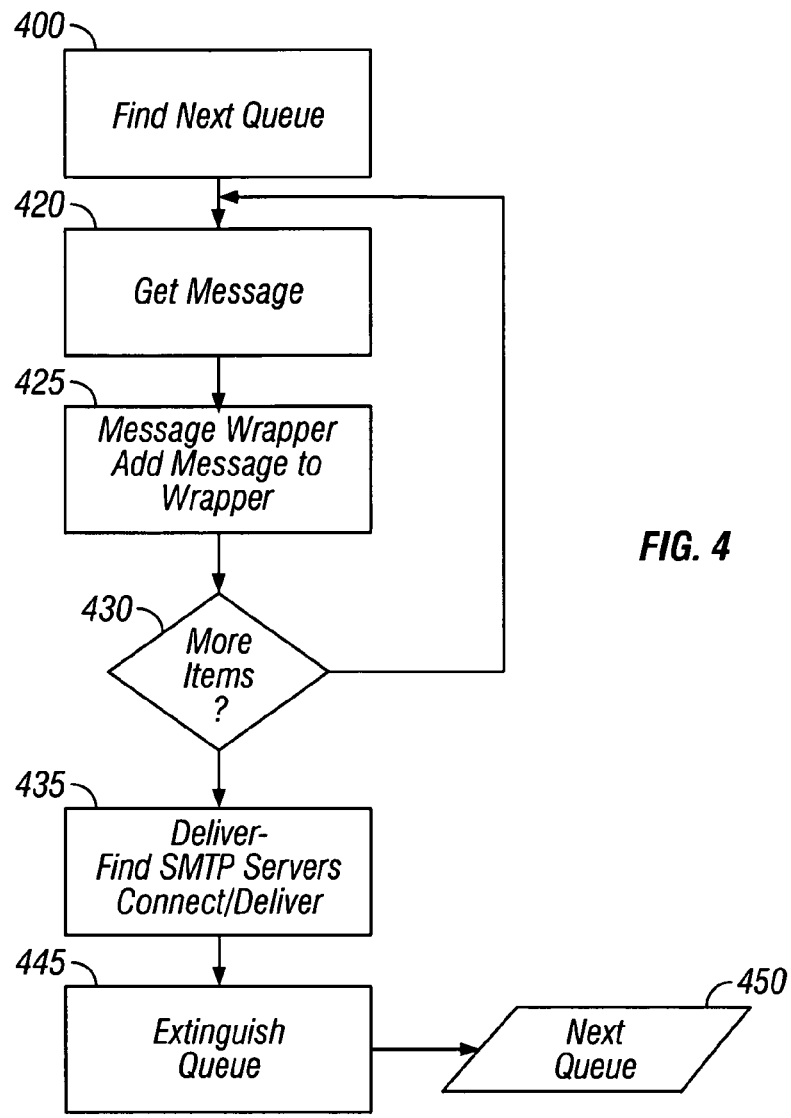
FIG. 4 shows a flowchart of processing the messages within the queues.

A command set, shown here as the output handler 240, can operate on the messages and queues according to the flowchart of FIG. 4. Each data node represents a particular message. The output handler processes the data node in order to send the mail to the intended recipient. The output handler 240 is shown as being a single process, but multiple processes may be operated at once, with, for example, each process handling a single queue at any one time or using a pipelined or multi-threaded system.

The process starts at 400, where the output handler looks for the next queue to process. This may be done in round-robin fashion, where each queue is assigned a number (n) for example, and the system simply looks for n+1 queue, where a maximum n of queues can exist. An alternative system is that the output handler always handles the queue with the greatest number of message nodes therein. In this example, queues are sorted according to their length and in that case, 400 finds the longest queue or the next full queue. In another embodiment, however, the amount of time that the queue has existed may also be taken into account. Another words, the longest queue would be sorted first unless that longest queue had not been processed for a specified time such as X minutes.

In a current queue at 420, the message is found, removed from the queue and processed for delivery at 420. A message wrapper is formed at 425, which may include multiple messages within the wrapper. Each of the messages within the wrapper has its own personalized content, but the common parts of the messages (such as the domain information) are provided by the wrapper itself. This may provide further streamlining of the process.

Step 430 determines if there are more items with the queue that can go within the same wrapper, and if so, gets the message at 420 and adds it to the wrapper at 425. After the queue is finished, processing is carried out by 435 which shows locating an SMTP server for the recipient domain, making a connection to the SMTP server, sending protocol tokens representing the message, and then delivering the message.

Once all of the messages in the queue have been removed, then the queue is removed from the memory map, or extinguished, at 445. If message processing fails due to a recoverable error, then the message may be pushed back into the queue, or into a new queue indicative of the same domain. Each time the message delivery fails, the "visit count" is incremented. Message failure may occur due to the recipient servers being unavailable, e.g. busy or inaccessible. Processing then moves to the next queue at 450.

Figure 5:
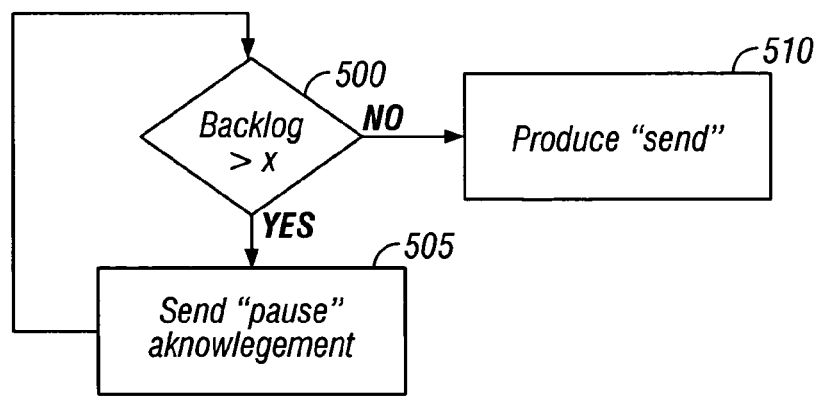
FIG. 5 shows a flowchart of one aspect of the load balancing.

An overflow prevention is shown in the flowchart of FIG. 5. Overflow may occur if messages are received faster than the queuing agent 225 can handle the messages. At 500, the input handler detects that it has a backlog which is greater than a specified amount, for example, 1000 messages, or if the size of the message queue will take longer than a specified time to process, such as 3 seconds. At 505 the input handler sends a "Pause" acknowledgment to the message server that is receiving the messages, e.g., the SMTP server. The pause acknowledgment indicates to the message server that it should stop sending messages that it has received. This causes the message server to save the received messages until the backlog is reduced.

The loop continues to check the backlog at 500. If the number of messages in the queue has fallen below the size limit at 500, then the relay server sends a "send" acknowledgement to the message server at 510. This allows the message server to start sending messages again.

The server application 702 may be able to transmit certain e-mail messages to certain domains quicker than others. In this case, the load balancer 732 may pass more e-mails for the faster domains to the server 702 than it does for the slower domains. The statistics polling process 764 and listener processes may carry this out. In this way the message server effectively adjusts the feed rate according to the rate at which the relay servers are performing. This may allow the system to take into account slower relay servers, and prevent blocking of messages by slower relay servers.

The basic load-balancing is made by the following steps:
get the next message parameter;
generate the full header and body with personalization;
query the current load conditions and compute delivery rates for the messages;
compute whether the system relay is ready for new messages; and
if so, push the messages.

In this way, the input handler receives the messages only when it can handle the messages. This provides one aspect of basic load balancing.

Figure 6:
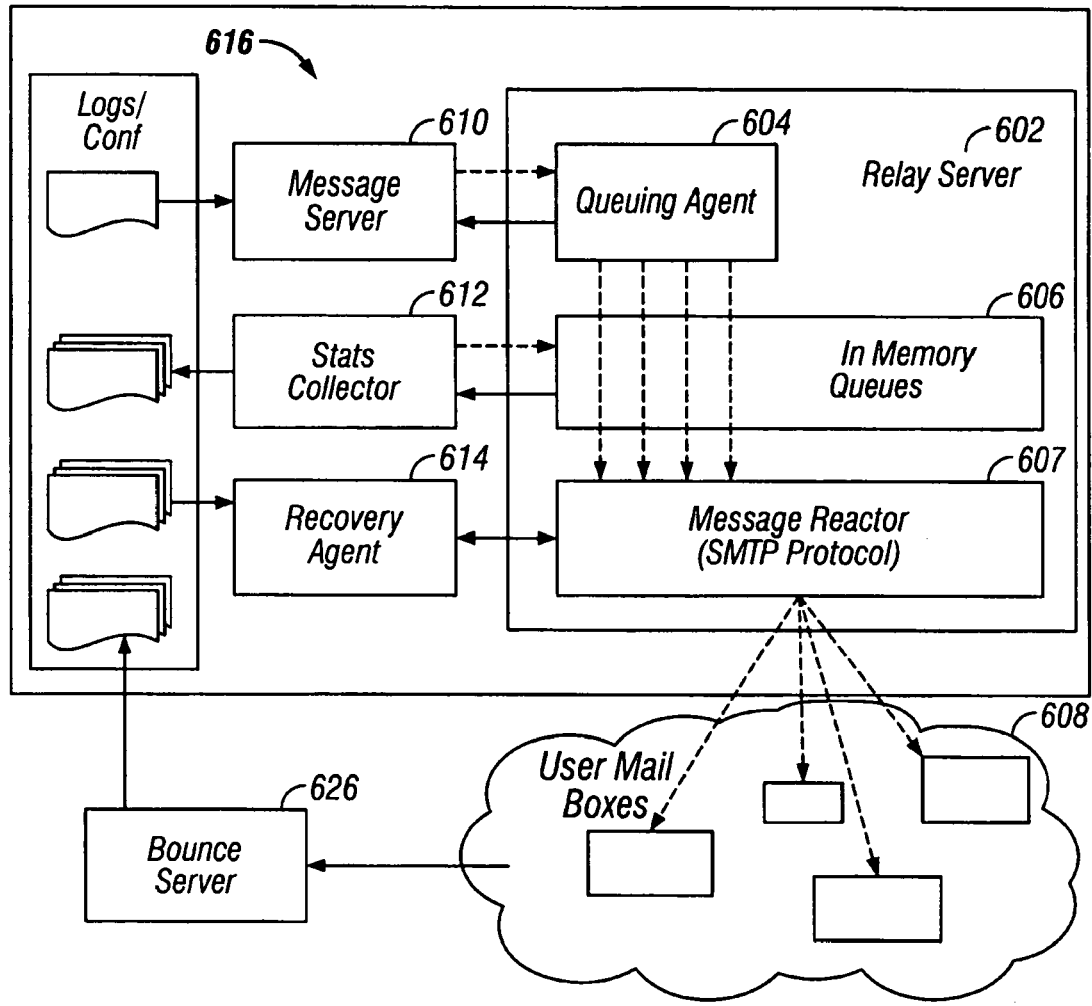
FIG. 6 shows a block diagram of the queues and agents handling the queues.

FIG. 6 shows a basic block diagram of the e-mail messaging system. A relay server 602 carries out the functions of handling the input messages. The relay server 602 includes a queuing agent 604, as well as a memory queue statistics element 606 and a message reactor 607. The message reactor 607 can be an SMTP server or a server that carries out comparable functions or a device that interfaces to an existing SMTP server.

The message reactor 607 delivers the messages to the user mailboxes 608. Bounce server 606 detects any messages that are intended for mailboxes which do not exist, and "stores" those messages for further processing.

An input parser 616 receives and characterizes the messages. Parser 616 includes a message server 610, statistics collector 612 and recovery agent 614. Each of these functions can be carried out in RAM or nonpersistent storage in order to facilitate the processing. The recovery agent stores snapshots of system variables to persistent storage, to allow the system to recover from a computer crash. In an alternative, although perhaps less preferred embodiment, however, queues or parts of queues can be maintained on a disk drive. The functions of these elements will be described in further detail herein.

Figure 7:
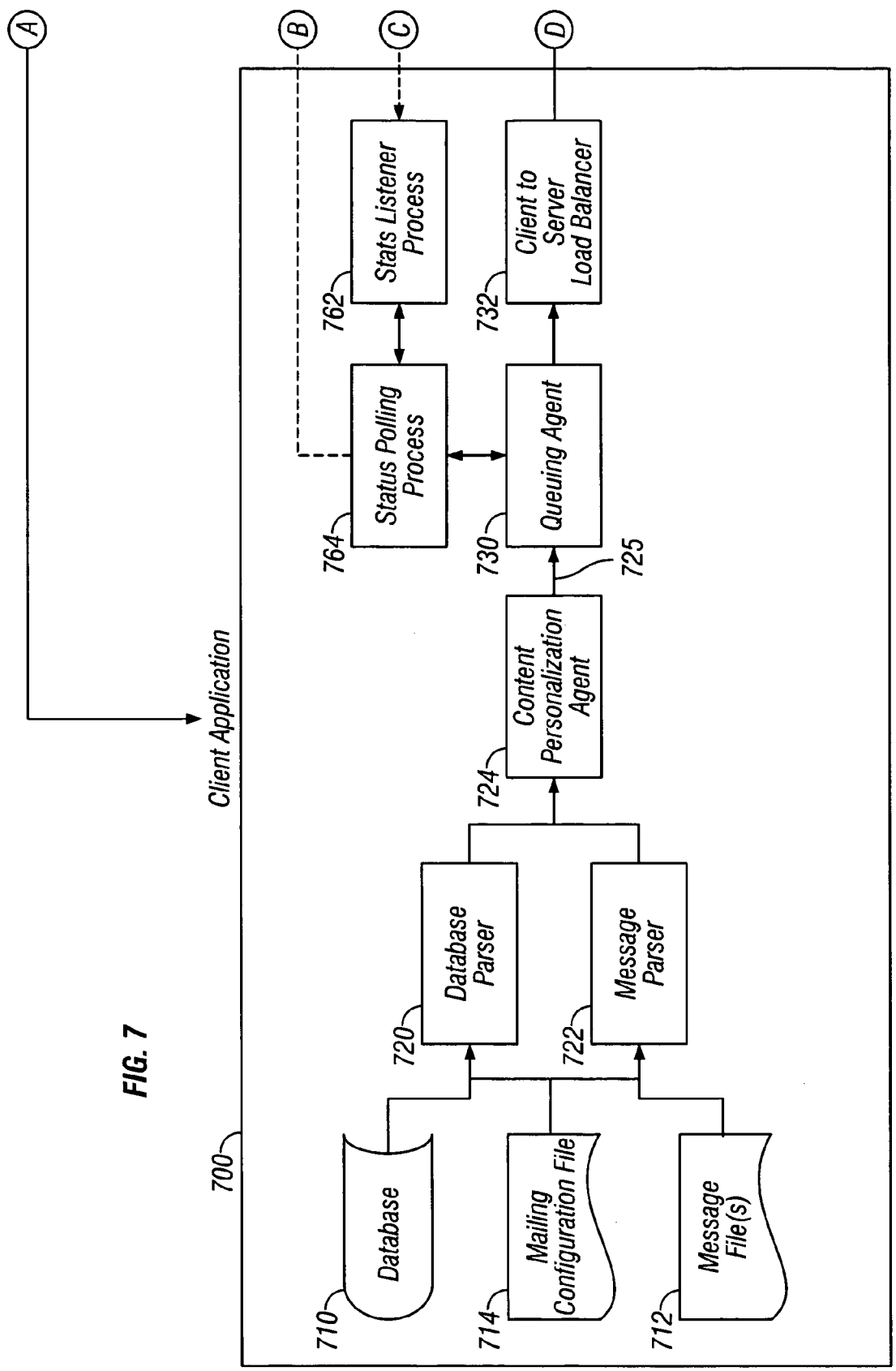
FIG. 7 shows the different functional elements that make up the operating program.
Figure 7:
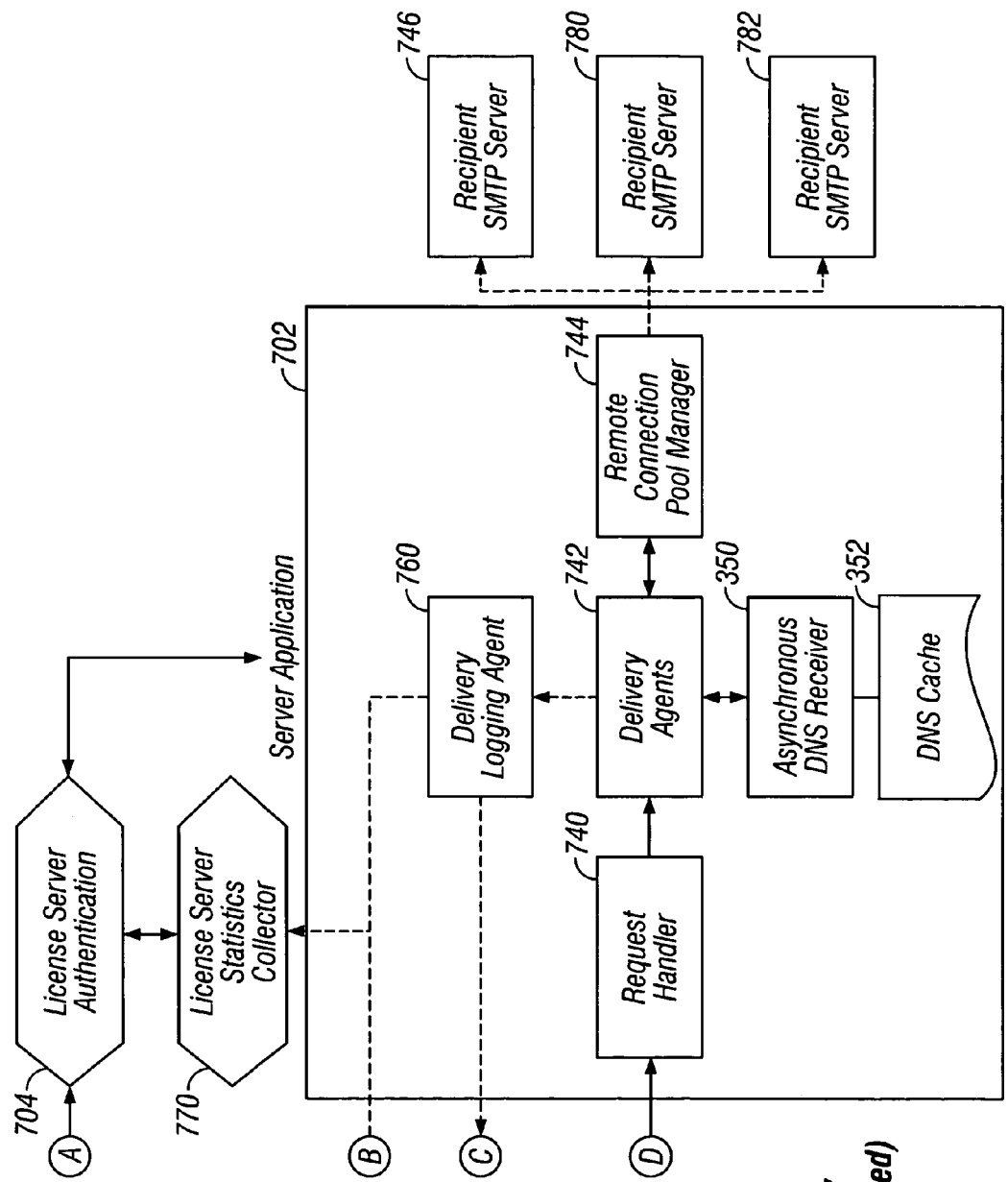

FIG. 7 is a flowchart of the passing of messages between the client, server and license server authentication unit.

The client application is shown as 700, and this may be for example, an e-mail client operating in a user's computer. The client application 700 creates personalized messages of a conventional type, and controls and commands sending those messages to the server. This is done using a number of agents; all of which may operate in software.

In the client application 700, a number of different processes cooperate together in order to form and send an e-mail. A message files database 712 represents the specific message files which are being sent, that is, the text and/or attachments that form the unique parts of the e-mail. The other parts that may be used for many different e-mails, are stored in a file, such as databases 710,714. A database 710 provides the e-mail addresses. Mailing preferences, including mailing information and the like for the recipient of the e-mail, are stored in the database 712. These two databases are used in conjunction with the mailing configuration file 714 that stores tracking information for the resulting e-mail.

The nodes, such as 252 shown in FIG. 2, may be pointers to areas in the message file 712 and/or areas in the database 710 and configuration file 714. In addition, each e-mail may be assigned with a unique ID formed from a bit vector of the queued e-mail. The bit vector may be stored in persistent storage. The bit vector may include sufficient information to reconstruct the message and the state of processing of each of the e-mails. This information is stored on disk or persistent storage. This enables recovering the entire state of processing of the system, without storing the entirety of the e-mails to disk.

Only certain data representing the contents of the e-mails, the locations in memory, and the like are stored. For example, the message IDs of each of the messages in each of the queues may be recorded periodically in order to save the state. If the relay server goes down for any reason, then the IDs of the messages that were currently being processed are recorded. The crash is remedied by starting a new message server to transfer these non-processed messages to other relay servers in the set up. If all relay servers go down simultaneously, the undelivered message IDs remain recorded, and can be sent by the system.

The e-mail address records in the database 710 are processed by a database parser 720 along with the contents of the mailing configuration file 714. Correspondingly, the message records in the message database 712 are processed by a message parser 722. The two parsers 720 and 722 act on the database records and pass parsed content to the personalization agent 724. This agent combines the parsed information from the address record with the parsed message. In one embodiment, the parsed message may be formed by a message template, filled in with tokens from the message list parameters, for example the parameters that are shown in element 230 in FIG. 2. The personalized content such as the name or other information is inserted into the output messages based on the personalization.

An e-mail message is created using the contents of the personalization agent 724 to create a message wrapper, which includes the message from the message parser 722 within the parsed address from the database parser 720 to create a personalized message 725. The resulting address is preferably manipulated solely within random access memory to enable quicker handling.

The personalized message 725 is then passed to a queuing agent 730 which takes the message input and queues it in the appropriate queues. The queues may be formed as described previously with reference to FIG. 2. The e-mail is generally queued according to the domain that will receive the e-mail. Often used domain names may receive multiple queues.

A client-to-server Load balancer 732 monitors the queues to ensure that the server 702 is not overwhelmed by incoming e-mails, as described above with reference to FIG. 5.

The server application 702 uses request handler 740 to take the messages and deliver the messages to one or more delivery agents 742. While only one delivery agent is shown, there may be many such agents. These delivery agents 742 communicate the e-mail messages to a remote connection pool manager 744 that manages a number of remote connections. The remote connection pool manager 744 establishes, maintains and terminates connections with remove SMTP servers shown as 746, 780 and 782.

The remote connection pool manager 744 may maintain the connections with the recipient SMTP servers directly; taking the burden of doing this off of the SMTP server at the local ISP.

The remote connection manager also uses asynchronous DNS resolvers 750 which operate from an off-line queue or cache 352 that is periodically updated. The DNS lookup may be asynchronous relative to the remaining parts of the message delivery. In this way, the lookup of DNS information at 750 from the DNS cache 752 can be performed in parallel with other parts of the message delivery.

The delivery agent or agents 742 are also in communication with the logging agent 760, which forms a monitor process to monitor which e-mails have been sent. This may enable complete recovery in the case of a system crash.

The mailing configuration file 714, the database parser 720 and message parser 722 operate on a predictable and logical basis. Therefore, by knowing where e-mail transmission was interrupted, the point that existed at the time of any system crash can easily be recovered.

The logging agent 760 also communicates with the statistics listener processes 762 and the statistics polling process 764. The logging agent 760 monitors successful and unsuccessful e-mail transmissions. Unsuccessful transmissions may occur when a remote server is unavailable or an unsuccessful DNS resolution occurs. The status polling process 764 is also in communication with the queuing agent 730 and maintains a record of the last outgoing message. In this way, an interrupted mail stream may be re-established at the point of interruption.

The listener process 762 logs or provides information about successful e-mail transmissions. In an embodiment, the information about e-mails, in the list, is listed by reference only. For example, the listener process 762 may indicate which can successfully delivered. This also maintains information or logs about rejected e-mails. The e-mails may be rejected in complete form, so that forensic analysis may be performed to determine how the failure arose.

The logging agent 760 may also indicate when the e-mail was clicked on or opened.

The logging agent collects and aggregates e-mail information from multiple sources and may also be in contact with a license server statistics collector 770, and also in contact with a license server authentication process 704. The license server authentication is also in communication with both the server and client.

The concept of license authentication is entirely a new paradigm according to the present system. The statistics collector 770 collects statistics about the number of messages that are processed by this system. In an embodiment, the server authentication 304 determines whether a user has paid appropriate license fees sufficient to cover the number/type of messages which have been sent. The server authentication 304 may refuse to send messages or may send warnings based on the number of messages having been exceeded. In this way, this software may operate effectively as pay-per-use software. That is, the initial software may be sold with some number of messages enabled. This may enable users to evaluate the software, almost as shareware, for a certain period of time. They may install it, and it will operate as desired until the specified number of messages is reached. After that, the user needs to pay additional license fees to process additional messages.

Although only a few embodiments have been described in detail above, other modifications are possible. Many of the modifications are described herein.

In an embodiment, the program features described above are written in C++ although it should be understood that other programs could be used to write this program, and also that the operations could be carried out using hardwired logic defined using hardware definition language, or FPGAs or other components.

While this system is described in the context of use with e-mail applications, it can be used or any system that sends messages, preferably text messages, over a network such as the Internet.

This system as embodied does not rely on third-party mail sending applications such as sendmail or other programs, although such can be used.

What is claimed is:

1. A method, comprising:
   (A) obtaining, at a server, a plurality of e-mails from one or more remote client computers, wherein the plurality of e-mails are intended for distribution by the server to a plurality of respective remote destinations;
   (B) creating, using one or more suitably programmed computers, a respective data node for each respective e-mail in said plurality of e-mails, wherein each respective data node includes (i) a pointer, wherein the pointer identifies the corresponding respective e-mail in persistent storage, (ii) an identification of the recipient of the respective e-mail, (iii) an identification of the sender of the respective e-mail, (iv) a destination domain of the respective e-mail, and (v) a visit count that tracks a number of attempts made to deliver the respective e-mail;
   (C) processing, using one or more suitably programmed computers, the plurality of data nodes within a non-persistent storage comprising a plurality of queues, wherein each queue in the plurality of queues corresponds to a specific domain, without requiring that information indicative of the e-mails be written to and then read from persistent storage during the processing (C) of the data nodes, wherein said processing (C) comprises, for each respective data node:
   (i) determining a destination domain of the respective data node;
   (ii) adding the respective data node to a queue in the non-persistent storage corresponding to the destination domain of the respective data node when the queue exists in the plurality of queues;
   (iii) creating a queue in the non-persistent storage corresponding to the destination domain and adding the respective data node to the created queue when the queue does not exist in the plurality of queues, wherein said processing (C) further comprises a method comprising:
   (a) selecting a respective queue in the plurality of queues that contains data nodes;
   (b) retrieving e-mails corresponding to each of the data nodes in the respective queue;
   (c) finding a remote server corresponding to the destination domain of the respective queue;
   (d) sending each of the retrieved e-mails corresponding to each of the data nodes in the respective queue to the remote server corresponding to the destination domain of the respective queue, wherein the sending (d) comprises reconstructing an e-mail in the retrieved e-mails from (i) the data node corresponding to the e-mail in the respective queue and (ii) the e-mail in persistent storage identified by the pointer to the respective e-mail that is in the data node corresponding to the e-mail, wherein, when a delivery failure message is received for a first e-mail in the retrieved e-mails at a time after said sending (d), said processing (C) further comprises:
  (i) pushing the data node corresponding to the first e-mail back onto the respective queue, and
  (ii) incrementing the visit count in the data node corresponding to the first e-mail to account for the failed delivery of the first e-mail; and
(e) extinguishing the respective queue when all e-mails in the respective queue have been delivered without receiving a delivery failure message.

2. A method as in claim 1, further comprising
storing, in persistent storage, recovery information indicative of the processing, said recovery information being used for recovery from a system fault.

3. A method as in claim 2, wherein said recovery information includes information indicative of the plurality of e-mails, wherein said information is indicative of less than the entirety of each e-mail in said plurality of e-mails.

4. A method as in claim 3, wherein said information indicative of an e-mail in the plurality of e-mails includes a bit vector.

5. A method as in claim 1, wherein said sending (d) of each of the e-mails corresponding to each of the data nodes in the first queue from the first queue to the destination domain is done at a specific sending instance.

6. A method as in claim 5, wherein said sending (d) comprises opening a communication channel to a single specified domain and sending each of the e-mails within the single communication channel.

7. A method as in claim 3, wherein said recovery information includes a numerical designation for each e-mail in said plurality of e-mails, and a state of processing of each e-mail in said plurality of e-mails.

8. A method as in claim 1, wherein said selecting (a) comprises selecting a queue in the plurality of queues which has the greatest number of the e-mails within the queue.

9. A method as in claim 1, wherein said selecting (a) comprises selecting a queue in the plurality of queues which has existed for the greatest period of time.

10. A method as in claim 1, further comprising, during said selecting of said first queue (a), asynchronously looking up domain name server information for a second queue in the plurality of queues, different than the first queue, and selecting the second queue.

11. A method as in claim 1, wherein the creating (B) separates personalized information about each e-mail in the plurality of e-mails from non-personalized information.

12. A method as in claim 11, wherein said non-personalized information includes e-mail destination information.

13. A method as in claim 5, wherein said processing further comprises:
  determining information about processing by said destination domain; and
  adjusting a speed of sending of the e-mails based on said information about processing of said destination domain.

14. A method as in claim 13, wherein said information about processing comprises a speed of e-mail processing.

15. A method as in claim 1, further comprising:
maintaining a log representing information relating to a number of e-mails in said plurality of e-mails which have been processed; and
comparing contents of said log with licensing information, to determine if the number of e-mails that has been processed exceeds a licensed number.

16. A method as in claim 1, comprising:
storing recovery information about a state of processing of the plurality of e-mails to persistent storage, wherein said recovery information comprises less than the entirety of each of the e-mails in the plurality of e-mails; and
wherein the processing (C) of the plurality of e-mails directs the plurality of e-mails to a desired location without writing the plurality of e-mails to persistent storage during said processing.

17. A method as in claim 16, wherein said recovery information includes information indicative of said plurality of e-mails, wherein said information is indicative of less than the entirety of each e-mail in said plurality of e-mails.

18. A method as in claim 16, wherein said processing (C) comprises:
  arranging information about the e-mails into said plurality of queues; and
  sending e-mails to a recipient, by sending a plurality of e-mails to a single domain, represented by a queue in said plurality of queues, at a specific sending instance.

19. A method as in claim 16, wherein said recovery information includes a number of e-mails, and a state of processing of each e-mail in said number of e-mails.

20. A method as in claim 16, further comprising:
processing the plurality of e-mails by separating personalized information about each e-mail in the plurality of e-mails from non-personalized information.

21. A method as in claim 20, wherein said non-personalized information includes destination information for the plurality of e-mails.

22. A method as in claim 18, wherein said processing comprises:
  determining a speed of processing of said single domain; and
  adjusting a speed of sending of the e-mails based on said speed of processing of said single domain.

23. A method as in claim 16, further comprising:
maintaining a log representing information relating to e-mails which have been processed; and
comparing contents of said log with licensing information, to determine if said information relating to e-mails exceeds a licensed number.

24. A computer system comprising:
(A) means for obtaining a plurality of e-mails from one or more remote client computers, wherein the plurality of e-mails are intended for distribution by the means for obtaining to a plurality of respective remote destinations;
(B) means for creating a respective data node for each respective e-mail in said plurality of e-mails, wherein each respective data node includes (i) a pointer, wherein the pointer identifies the corresponding respective e-mail in persistent storage, (ii) an identification of the recipient of the respective e-mail, (iii) an identification of the sender of the respective e-mail, (iv) a destination domain of the respective e-mail, and (v) a visit count that tracks a number of attempts made to deliver the respective e-mail;

(C) means for processing the plurality of data nodes within a non-persistent storage comprising a plurality of queues, wherein each queue in the plurality of queues corresponds to a specific domain, without requiring that information indicative of the e-mails be written to and then read from persistent storage during the processing of the e-mails, wherein said processing (C) comprises, for each respective data node:

(i) determining a destination domain of the respective data node;

(ii) adding the respective data node to a queue in the non-persistent storage corresponding to the destination domain of the respective data node when the queue exists in the plurality of queues;

(iii) creating a queue in the non-persistent storage corresponding to the destination domain and adding the respective data node to the created queue when the queue does not exist in the plurality of queues; and wherein the means for processing (C) further comprises instructions for performing a method comprising:

(a) selecting a respective queue in the plurality of queues that contains data nodes;

(b) retrieving e-mails corresponding to each of the data nodes in the respective queue;

(c) finding a remote server corresponding to the destination domain of the respective queue;

(d) sending each of the retrieved e-mails corresponding to each of the data nodes in the respective queue to the remote server corresponding to the destination domain of the respective queue, wherein the sending (d) comprises reconstructing an e-mail in the retrieved e-mails from (i) the data node corresponding to the e-mail in the respective queue and (ii) the e-mail in persistent storage identified by the pointer to the respective e-mail that is in the data node corresponding to the e-mail, wherein, when a delivery message is received for a first e-mail in the retrieved e-mails at a time after the sending (d), said means for processing (C) further comprises instruction for:

(i) pushing the data node corresponding to the first e-mail back onto the respective queue, and (ii) incrementing the visit count in the data node corresponding to the first e-mail to account for the failed delivery of the respective e-mail; and (e) extinguishing the respective queue when all e-mails in the respective queue have been delivered without receiving a delivery failure message.

25. A computer system comprising:

(A) a module for obtaining, using a suitably programmed computer, a plurality of e-mails from one or more remote client computers, wherein the plurality of e-mails are intended for distribution to a plurality of respective remote destinations;

(B) a module for creating, using a suitably programmed computer, a respective data node for each respective e-mail in said plurality of e-mails, wherein each respective data node includes (i) a pointer, wherein the pointer identifies the corresponding respective e-mail in persistent storage, (ii) an identification of the recipient of the respective e-mail, (iii) an identification of the sender of the respective e-mail, (iv) a destination domain of the respective e-mail, and (v) a visit count that tracks a number of attempts made to deliver the respective e-mail;

(C) a module for processing, using a suitably programmed computer, the plurality of data nodes solely within a non-persistent storage comprising a plurality of queues, wherein each queue in the plurality of queues corresponds to a specific domain, without requiring that information indicative of the e-mails be written to and then read from persistent storage during the processing of the e-mails, wherein said processing (C) comprises, for each respective data node:

(i) determining a destination domain of the respective data node;

(ii) adding the respective data node to a queue in the non-persistent storage corresponding to the destination domain of the respective data node when the queue exists in the plurality of queues;

(iii) creating a queue in the non-persistent storage corresponding to the destination domain and adding the respective data node to the created queue when the queue does not exist in the plurality of queues; and wherein the processing module (C) further comprises instructions for performing a method comprising:

(a) selecting a respective queue in the plurality of queues that contains data nodes;

(b) retrieving e-mails corresponding to each of the data nodes in the respective queue;

(c) finding a remote server corresponding to the destination domain of the respective queue;

(d) sending each of the retrieved e-mails corresponding to each of the data nodes in the respective queue to the remote server corresponding to the destination domain of the respective queue, wherein the sending (d) comprises reconstructing an e-mail in the retrieved e-mails from (i) the data node corresponding to the e-mail in the respective queue and (ii) the e-mail in persistent storage identified by the pointer to the respective e-mail that is in the data node corresponding to the e-mail, wherein, when a delivery message is received for a first e-mail in the retrieved e-mails at a time after the sending (d), said module for processing (C) further comprises instructions for:

(i) pushing the data node corresponding to the first e-mail back onto the respective queue, and (ii) incrementing the visit count in the data node corresponding to the first e-mail to account for the failed delivery of the respective e-mail; and (e) extinguishing the respective queue when all e-mails in the respective queue have been delivered without receiving a delivery failure message.

26. The method of claim 1, wherein the processing (C) further comprises:

creating a unique identifier for the e-mail corresponding to the respective node from a bit vector of the respective data node stored in the queue, and storing the bit vector in persistent storage, wherein the bit vector comprises sufficient information to reconstruct the corresponding e-mail and the state of processing of the corresponding e-mail.

27. The computer system of claim 24, wherein the means for processing (C) further comprises:

creating a unique identifier for the e-mail corresponding to the respective node from a bit vector of the respective data node stored in the queue, and storing the bit vector in persistent storage, wherein the bit vector comprises sufficient information to reconstruct the corresponding e-mail and the state of processing of the corresponding e-mail.

28. The computer system of claim 25, wherein the means for processing (C) further comprises:
creating a unique identifier for the e-mail corresponding to the respective node from a bit vector of the respective data node stored in the queue, and
storing the bit vector in persistent storage, wherein the bit vector comprises sufficient information to reconstruct the corresponding e-mail and the state of processing of the corresponding e-mail.

29. The method of claim 1, wherein the method comprising steps (a) through (e) of the processing (C) is concurrently performed for each queue in the plurality of queues.

30. The computer system of claim 24, wherein the instructions for performing the method comprising steps (a) through (e) of the means for processing (C) is concurrently performed for each queue in the plurality of queues.

31. The computer system of claim 25, wherein the instructions for performing the method comprising steps (a) through (e) of the module for processing (C) is concurrently performed for each queue in the plurality of queues.

32. The method of claim 1, wherein two or more queues in the plurality of queues correspond to the same destination domain.

33. The computer system of claim 24, wherein two or more queues in the plurality of queues correspond to the same destination domain.

34. The computer system of claim 25, wherein two or more queues in the plurality of queues correspond to the same destination domain.

35. The method of claim 1, wherein each queue in the plurality of queues corresponds to a different destination domain.

36. The computer system of claim 24, wherein each queue in the plurality of queues corresponds to a different destination domain.

37. The computer system of claim 25, wherein each queue in the plurality of queues corresponds to a different destination domain.

* * * * *